United States Patent
Ise et al.

(10) Patent No.: US 10,693,166 B2
(45) Date of Patent: Jun. 23, 2020

(54) FUEL CELL SYSTEM

(71) Applicant: Panasonic Intellectual Property Management Co., Ltd., Osaka (JP)

(72) Inventors: Takehiko Ise, Osaka (JP); Akinori Yukimasa, Nara (JP); Junji Morita, Kyoto (JP); Miki Abe, Osaka (JP); Yoshito Usuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/825,169

(22) Filed: Nov. 29, 2017

(65) Prior Publication Data
US 2018/0159158 A1    Jun. 7, 2018

(30) Foreign Application Priority Data
Dec. 7, 2016 (JP) .................. 2016-237230

(51) Int. Cl.
*H01M 8/04119* (2016.01)
*H01M 8/04089* (2016.01)
*H01M 8/0656* (2016.01)
*H01M 8/0612* (2016.01)
*H01M 8/0438* (2016.01)
(Continued)

(52) U.S. Cl.
CPC ..... *H01M 8/0656* (2013.01); *H01M 8/04014* (2013.01); *H01M 8/04029* (2013.01); *H01M 8/04097* (2013.01); *H01M 8/04126* (2013.01); *H01M 8/04141* (2013.01); *H01M 8/04164* (2013.01); *H01M 8/04425* (2013.01); *H01M 8/0618* (2013.01); *H01M 8/04134* (2013.01);
(Continued)

(58) Field of Classification Search
CPC ............ H01M 8/04–04268; H01M 8/06–0693
See application file for complete search history.

(56) References Cited

U.S. PATENT DOCUMENTS

| | | | |
|---|---|---|---|
| 2002/0094467 A1* | 7/2002 | Nonobe | H01M 8/04097 |
| | | | 429/411 |
| 2002/0098395 A1* | 7/2002 | Shimanuki | H01M 8/04149 |
| | | | 429/414 |

(Continued)

FOREIGN PATENT DOCUMENTS

| | | | | |
|---|---|---|---|---|
| JP | 2007-052948 | 3/2007 | | |
| WO | WO-2009083067 A2 * | 7/2009 | ........ | H01M 8/04007 |

OTHER PUBLICATIONS

English Machine translation of WO 2009/083067, Diedrich et al. Available Jul. 9, 2009. (Year: 2009).*

(Continued)

*Primary Examiner* — Jonathan G Leong
*Assistant Examiner* — Jacob Buchanan
(74) *Attorney, Agent, or Firm* — McDermott Will & Emery LLP (57) ABSTRACT

A fuel cell system includes a fuel cell that generates electric power using fuel gas and oxidant gas, a fuel gas supply path through which the fuel gas is supplied to an anode inlet of the fuel cell, a recycle gas path through which anode off-gas discharged from an anode outlet of the fuel cell returns to the fuel gas supply path, and a pressure booster arranged in the recycle gas path, and the pressure booster is arranged above a confluence portion where the fuel gas supply path and the recycle gas path meet each other when gravity acts downward from above.

10 Claims, 8 Drawing Sheets

(51) Int. Cl.
*H01M 8/04014* (2016.01)
*H01M 8/04029* (2016.01)
H01M 8/04537 (2016.01)
H01M 8/0444 (2016.01)

(52) U.S. Cl.
CPC .... *H01M 8/04477* (2013.01); *H01M 8/04582* (2013.01)

(56) References Cited

U.S. PATENT DOCUMENTS

| | | | | |
|---|---|---|---|---|
| 2002/0119356 A1* | 8/2002 | Shimanuki | ........ | H01M 8/04126 429/414 |
| 2003/0138688 A1* | 7/2003 | Hattori | ............ | H01M 8/04029 429/425 |
| 2003/0211374 A1 | 11/2003 | Dehne | | |
| 2008/0014475 A1* | 1/2008 | Leboe | ............ | H01M 8/04007 429/413 |
| 2009/0280371 A1 | 11/2009 | Katano | | |
| 2010/0143754 A1* | 6/2010 | Greszler | .......... | H01M 8/04097 429/458 |
| 2010/0227230 A1* | 9/2010 | Goebel | ............ | H01M 8/04097 429/414 |
| 2013/0108936 A1* | 5/2013 | McElroy | ............ | H01M 8/0668 429/410 |

OTHER PUBLICATIONS

The Extended European Search Report dated Mar. 15, 2018 for the related European Patent Application No. 17204037.0.

* cited by examiner

FUEL CELL SYSTEM

BACKGROUND

1. Technical Field

The present disclosure relates to fuel cell systems.

2. Description of the Related Art

A configuration of a fuel cell system has been proposed, where fuel gas (anode off-gas) not used in electric power generation of the fuel cell is reused (recycled) by being returned to the anode (see for example, Japanese Unexamined Patent Application Publication No. 2007-52948). This configuration increases the efficiency of the electric power generation in the fuel cell system, compared to a configuration where anode off-gas is not recycled.

According to Japanese Unexamined Patent Application Publication No. 2007-52948, in a recycle gas path for returning anode off-gas discharged from the anode of the fuel cell to the fuel cell, a circulator (pressure booster) that forces the anode off-gas to be conveyed to the anode of the fuel cell and a gas liquid separator that separates moisture in the anode off-gas from the anode off-gas are arranged.

SUMMARY

In the conventional example, however, problems regarding condensed water caused in the anode off-gas by the circulator (pressure booster) are not sufficiently reviewed.

One non-limiting and exemplary embodiment has been made in view of such circumstances and provides a fuel cell system that can convey condensed water caused in anode off-gas by a pressure booster more suitably than conventional systems.

In one general aspect, to address the aforementioned problems, the techniques disclosed here feature a fuel cell system including a fuel cell that generates electric power using fuel gas and oxidant gas, a fuel gas supply path through which the fuel gas is supplied to an anode inlet of the fuel cell, a recycle gas path through which anode off-gas discharged from an anode outlet of the fuel cell returns to the fuel gas supply path, and a pressure booster arranged in the recycle gas path, the pressure booster being arranged above a confluence portion where the fuel gas supply path and the recycle gas path meet each other when gravity acts downward from above.

A fuel cell system according to an aspect of the present disclosure is advantageous in that condensed water caused in anode off-gas by a pressure booster can be conveyed more suitably than conventional systems.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Careful review of problems regarding condensed water caused in anode off-gas by a circulator (pressure booster) has brought findings described below.

The saturated vapor volume of anode off-gas reduces as pressure increases when the temperature is constant and thus, water vapor in the anode off-gas may condense into water by being pressurized by a pressure booster.

According to Japanese Unexamined Patent Application Publication No. 2007-52948, a confluence portion where a pipe through which anode off-gas flows and a pipe through which fuel gas flows meet each other is present above the pressure booster. Thus, when the pressurization of the anode off-gas causes condensed water in the anode off-gas, the condensed water flows into the pressure booster under the action of gravity. Then, it raises a possibility of the flow rate of the anode off-gas becoming unstable because of water clogging caused in a channel of the pressure booster by the condensed water or a possibility of the condensed water making the pressure booster decrease its performance or go out of order.

A fuel cell system according to a first aspect of the present disclosure has been conceived on the basis of these findings and includes a fuel cell that generates electric power using fuel gas and oxidant gas, a fuel gas supply path through which the fuel gas is supplied to an anode inlet of the fuel cell, a recycle gas path through which anode off-gas discharged from an anode outlet of the fuel cell returns to the fuel gas supply path, and a pressure booster arranged in the recycle gas path, the pressure booster being arranged above a confluence portion where the fuel gas supply path and the recycle gas path meet each other when gravity acts downward from above.

Such a configuration enables condensed water caused in anode off-gas by a pressure booster to be conveyed more suitably than conventional systems. Specifically, by arranging the pressure booster above the confluence portion, even when condensed water is caused in the anode off-gas, the condensed water is enabled to flow into the confluence portion through the recycle gas path and flow of the condensed water into the pressure booster can be inhibited. Thus, possibilities of the flow rate of the anode off-gas becoming unstable because of water clogging caused in a channel of the pressure booster by the condensed water can be reduced. Although the pressure booster can decrease its performance or go out of order when condensed water develops corrosion or contamination of the pressure booster, the fuel cell system of the present embodiment can reduce such possibilities.

In a fuel cell system according to a second aspect of the present disclosure, which is based on the fuel cell system according to the first aspect, the recycle gas path between the pressure booster and the confluence portion may extend at an identical level to the pressure booster and a level below the pressure booster, or extends only below the pressure booster.

In such a configuration, the recycle gas path between the pressure booster and the confluence portion extends at an identical level to the pressure booster and a level below the pressure booster, or extends only below the pressure booster and thus, the condensed water caused in the anode off-gas by the pressure booster can be smoothly conveyed to the confluence portion without flowing backward toward the pressure booster. Consequently, flow of the condensed water into the pressure booster can be inhibited and further, water clogging in the recycle gas path can be inhibited.

In a fuel cell system according to a third aspect of the present disclosure, which is based on the fuel cell system according to the first or second aspect, the anode inlet may be arranged below the confluence portion.

Such a configuration enables the fuel gas supply path between the anode inlet and the confluence portion of the fuel cell to extend with a descending gradient. Since the condensed water in the confluence portion can thus be smoothly conveyed to the fuel cell, water clogging in the fuel gas supply path can be inhibited. In addition, in the present fuel gas supply path and fuel cell, the condensed water can be utilized for humidification of the fuel gas.

Embodiments of the present disclosure are described below by referring to the accompanying drawings. The embodiments described below present examples of the above-described aspects. Thus, the shapes, materials, constituents, arrangement positions and connection forms of the constituents, and the like that are mentioned below are mere examples and are not intended to limit the above-described aspects unless otherwise recited in the claims. Among the constituents mentioned below, the constituents that are not recited in the independent claim indicating the most superordinate concept of the present aspects can be explained as given constituents. In the drawings, descriptions of the constituents that have identical references may be omitted. While the drawings schematically illustrate each constituent so as to facilitate understanding, the shapes, dimensional ratios, and the like therein may be indicated inaccurately.

First Embodiment

Figure 1:
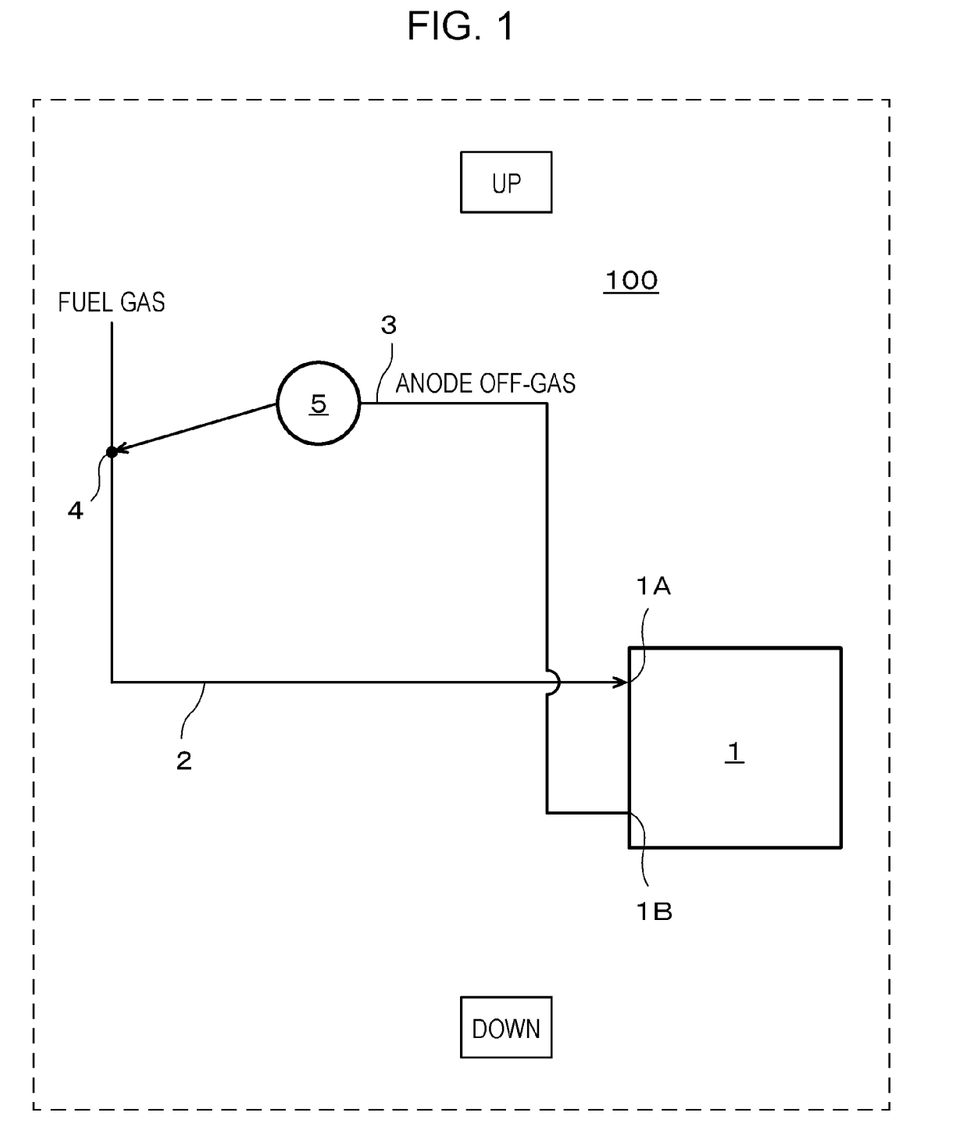
FIG. 1 illustrates an example of a fuel cell system according to a first embodiment.

FIG. 1 illustrates an example of a fuel cell system 100 according to a first embodiment. In FIG. 1, "UP" and "DOWN" are indicated and gravity acts downward from above, i.e. from a direction denoted as "UP", as well as in FIGS. 2 to 8.

In the example illustrated in FIG. 1, the fuel cell system 100 includes a fuel cell 1, a fuel gas supply path 2, a recycle gas path 3, and a pressure booster 5.

The fuel cell 1 generates electric power using fuel gas and oxidant gas. The fuel cell 1 may be any kind. Although a polymer electrolyte fuel cell (PEFC) is described as an example of the fuel cell 1 in the fuel cell system 100 according to the present embodiment, the fuel cell 1 is not limited to a PEFC.

The fuel gas supply path 2 is a channel for supplying fuel gas to an anode inlet 1A of the fuel cell 1. That is, a downstream end of the fuel gas supply path 2 is connected to the anode inlet 1A of the fuel cell 1 and an upstream end of the fuel gas supply path 2 is connected to a supply source of the fuel gas, which is not illustrated. The supply source of the fuel gas has predetermined supply source pressure and examples of the supply source can include a fuel gas infrastructure and a fuel gas cylinder. Example of the fuel gas can include hydrogen gas. In this case, the anode off-gas is off-hydrogen-gas not used in the fuel cell 1.

The recycle gas path 3 is a channel for returning the anode off-gas discharged from an anode outlet 1B of the fuel cell 1 to the fuel gas supply path 2. That is, an upstream end of the recycle gas path 3 is connected to the anode outlet 1B of the fuel cell and a downstream end of the recycle gas path 3 is connected to the fuel gas supply path 2.

Although not illustrated in FIG. 1, devices needed in the electric power generation of the fuel cell 1 are arranged as appropriate.

For example, in the fuel cell system 100, an oxidant gas supply unit that supplies oxidant gas to the cathode of the fuel cell 1. Example of the oxidant gas can include air. In this case, examples of the oxidant gas supply unit can include an air blowing device, such as a blower or a sirocco fan.

When the supply source pressure of the supply source of the fuel gas is higher than the supply pressure needed for the fuel cell system 100, which is the supply pressure of the fuel gas, a governor or the like for lowering the pressure of the fuel gas to constant supply pressure may be arranged in the fuel gas supply path 2.

The fuel cell system 100 may further include an outlet path, which branches from an appropriate position of the recycle gas path 3 to pass to the air, and a purging valve, which is arranged in the outlet path. Accordingly, the concentration of an impurity in the anode off-gas can be decreased and the concentration of hydrogen in the anode off-gas can be restored. Specifically, while the purging valve is closed, the anode off-gas circulates to return from the anode outlet 1B to the anode inlet 1A of the fuel cell 1 until being used in the electric power generation of the fuel cell 1. Then, in the course of the anode off-gas circulating through the circulation path, an impurity except the fuel gas, which is hydrogen gas for example, increases in the anode off-gas over time. For example, air flows to the cathode of the fuel cell 1 and thus, examples of the impurity can include nitrogen gas that escapes from the cathode to the anode through an electrolyte film. Since the concentration of the hydrogen in the anode off-gas decreases as the impurity in the anode off-gas increases, during the electric power generation of the fuel cell 1, the anode off-gas that contains the impurity is released (purged) from the outlet path to the air by temporarily opening the purging valve at an appropriate time.

The pressure booster 5 is arranged in the recycle gas path 3. The pressure booster 5 is a device that forces the anode off-gas to be conveyed to the fuel gas supply path 2. The pressure booster 5 may have any configuration only when the configuration can force off-gas to be conveyed to the fuel gas supply path 2. Example of the pressure booster 5 can include a diaphragm pump, a rotating pump, and a reciprocating pump.

When gravity acts downward from above, the pressure booster 5 is arranged above a confluence portion 4 where the fuel gas supply path 2 and the recycle gas path 3 meet each other. The pressure booster 5 may be arranged at a level higher than a level of the confluence portion 4 where the fuel gas supply path 2 and the recycle gas path 3 meet each other, the level of the pressure booster 5 and the level of the confluence portion 4 being measured from a ground along a gravity direction.

The recycle gas path 3 between the pressure booster 5 and the confluence portion 4 extends at an identical level to the pressure booster 5 and a level below the pressure booster 5, or extends only below the pressure booster 5. In other words, no part of the recycle gas path 3 between the pressure booster 5 and the confluence portion 4 is located above the pressure booster. The purport of "the recycle gas path 3 extending at an identical level to the pressure booster 5 and a level below the pressure booster 5, or extends only below the pressure booster 5" excludes pipe routing by which part of the channel members (pipes) constituting the recycle gas path 3 extends in higher positions than the pressure booster 5 in, for example, the configuration where the pressure booster 5 is arranged above the confluence portion 4. This is because performing the aforementioned pipe routing makes it difficult for condensed water caused in the anode off-gas by the pressure booster 5 to reach the confluence portion 4 under the action of gravity.

The anode inlet 1A of the fuel cell 1 is arranged below the aforementioned confluence portion 4. The confluence portion 4 is a channel where the anode off-gas and the fuel gas are mixed and examples of a channel member that constitutes the confluence portion 4 can include a T-shaped joint.

As described above, in the fuel cell system 100 according to the present embodiment, condensed water caused in the anode off-gas by the pressure booster 5 can be conveyed more suitably than conventional systems.

Specifically, the saturated vapor volume of the anode off-gas reduces as pressure increases when the temperature is constant and thus, water vapor in the anode off-gas may condense to water by the pressure booster 5 pressurizing the anode off-gas. So by arranging the pressure booster 5 above the confluence portion 4, even when water vapor in the anode off-gas condenses to water through the pressurization of the anode off-gas, the condensed water can be caused to flow into the confluence portion 4 through the recycle gas path 3 and flow of the condensed water into the pressure booster 5 can be inhibited. As a result, possibilities of the flow rate of the anode off-gas becoming unstable because of water clogging caused in a channel of the pressure booster 5 by the condensed water can be reduced. In addition, although there are possibilities that when the condensed water develops corrosion or contamination of the pressure booster 5, the pressure booster 5 may decrease in performance or go out of order, the fuel cell system 100 according to the present embodiment can reduce such possibilities.

Further, since the recycle gas path 3 between the pressure booster 5 and the confluence portion 4 extends at an identical level to the pressure booster 5 and a level below the pressure booster 5, or only below the pressure booster 5, the condensed water caused in the anode off-gas by the pressure booster 5 can be smoothly conveyed to the confluence portion 4 without flowing backward toward the pressure booster 5. Consequently, flow of the condensed water into the pressure booster 5 can be inhibited and water clogging in the recycle gas path 3 can also be inhibited.

Further, since the anode inlet 1A of the fuel cell 1 is arranged below the confluence portion 4, the fuel gas supply path 2 between the confluence portion 4 and the fuel cell 1 can extend with a descending gradient. Thus, since the condensed water in the confluence portion 4 can be smoothly conveyed to the fuel cell 1, water clogging in the fuel gas supply path 2 can be inhibited. Further, in the fuel gas supply path 2 and the fuel cell 1, the condensed water can be utilized for humidification of the fuel gas.

Second Embodiment

Figure 2:
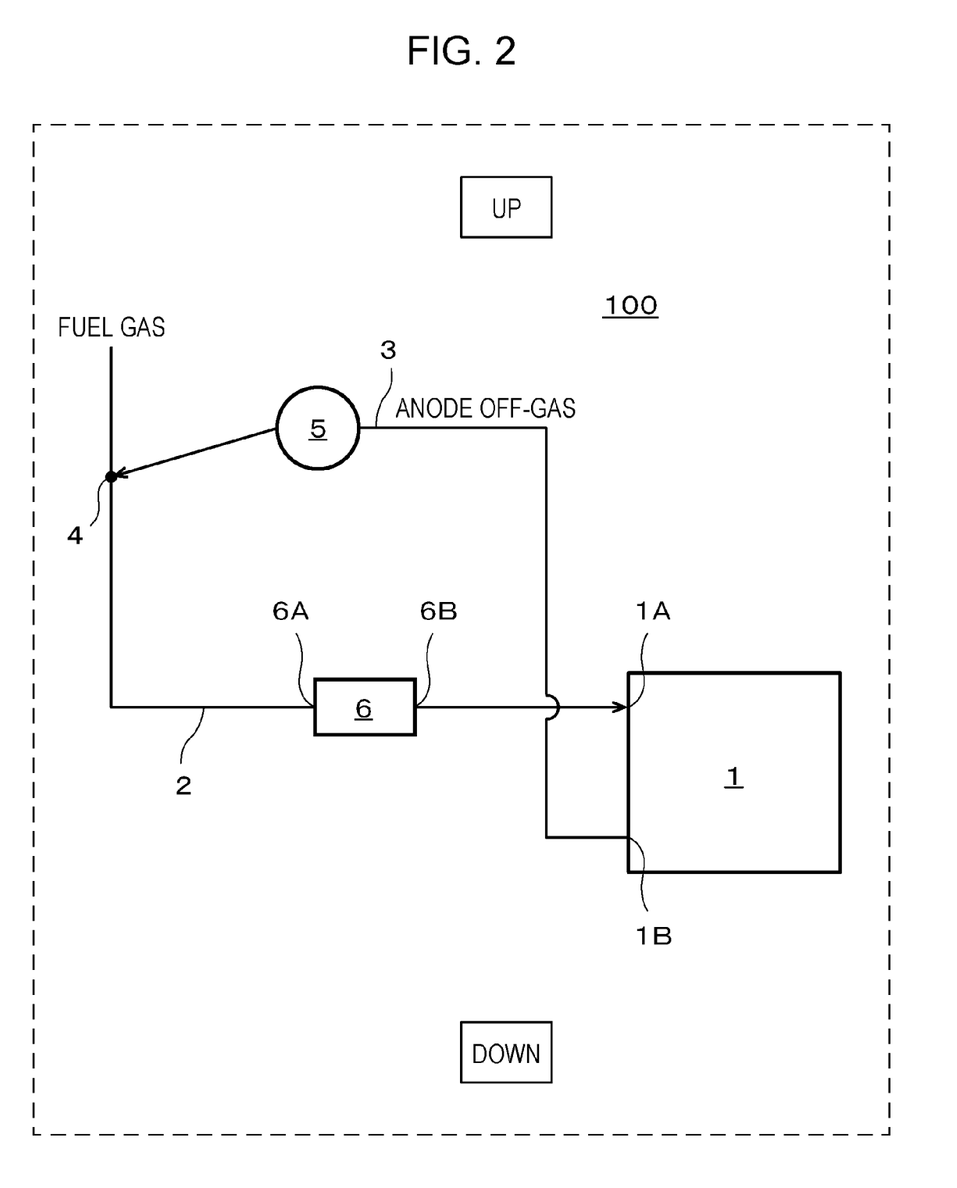
FIG. 2 illustrates an example of a fuel cell system according to a second embodiment.

FIG. 2 illustrates an example of a fuel cell system 100 according to a second embodiment.

In the example illustrated in FIG. 2, the fuel cell system 100 includes a fuel cell 1, a fuel gas supply path 2, a recycle gas path 3, a pressure booster 5, and a humidifier 6. The fuel cell 1, the fuel gas supply path 2, the recycle gas path 3, and the pressure booster 5 are similar to those in the first embodiment and thus, descriptions thereof are omitted.

The fuel cell system 100 according to the second embodiment, which is based on the fuel cell system 100 according to any of the first to third aspects, includes the humidifier 6 arranged in the fuel gas supply path 2, and in a direction in which the anode off-gas flows, the fuel cell 1, the pressure booster 5, the confluence portion 4, and the humidifier 6 are arranged in this order, and a fuel gas inlet 6A of the humidifier 6 is arranged below the confluence portion 4.

The fuel gas inlet 6A of the humidifier 6 is connected to the confluence portion 4 through the fuel gas supply path 2 and a fuel gas outlet 6B of the humidifier 6 is connected to the anode inlet 1A of the fuel cell 1 through the fuel gas supply path 2. That is, as described above, in the direction in which the anode off-gas flows, the fuel cell 1, the pressure booster 5, the confluence portion 4, and the humidifier 6 are arranged in this order.

The humidifier 6 is a device that humidifies the fuel gas. The humidifier 6 may have any configuration only when the configuration can humidify the fuel gas.

The humidifier 6 may be a water tank with the fuel gas inlet 6A and the fuel gas outlet 6B that are arranged in a wall portion corresponding to upper space. Accordingly, in passing through the upper space of the water tank, the fuel gas can be humidified through vaporization of the water present in lower space of the water tank.

The humidifier 6 may be a bubbling tank that accommodates water. In this case, the fuel gas supply path 2 that passes through the fuel gas inlet 6A extends into the water in the bubbling tank. The fuel gas supply path 2 that passes through the fuel gas outlet 6B extends to the upper space of the bubbling tank. Accordingly, in passing through the bubbling tank, the fuel gas can be humidified.

The humidifier 6 may be a total heat exchanger. Specific examples of such a total heat exchanger are described later in first and second examples of the present embodiment.

As described above, since in the fuel cell system 100 according to the present embodiment, the fuel gas inlet 6A of the humidifier 6 is arranged below the confluence portion 4, the fuel gas supply path 2 between the confluence portion 4 and the fuel cell 1 can extend with a descending gradient. Accordingly, the condensed water in the confluence portion 4 can be smoothly conveyed to the humidifier 6 and thus, water clogging in the fuel gas supply path 2 can be inhibited. Further, in the humidifier 6, the condensed water can be utilized for the humidification of the fuel gas.

The fuel cell system 100 according to the present embodiment may have a configuration similar to that of the fuel cell system 100 according to the first embodiment, except the above-described features.

Variation

Figure 3:
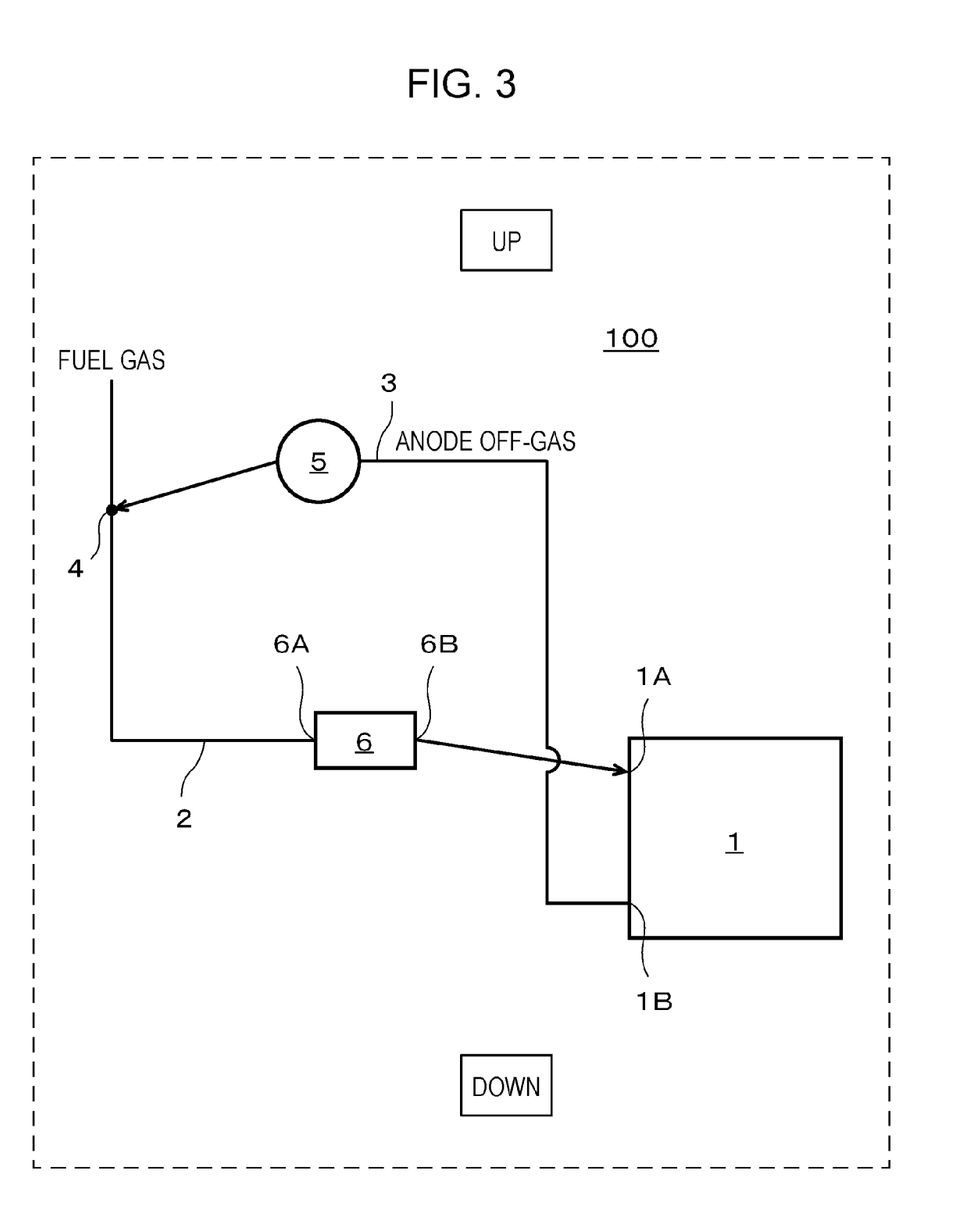
FIG. 3 illustrates an example of a fuel cell system according to a variation of the second embodiment.

FIG. 3 illustrates an example of the fuel cell system 100 according to a variation of the second embodiment.

Since the configuration of the fuel cell system 100 according to the present variation is similar to that in the second embodiment except the vertical positions of the anode inlet 1A of the fuel cell 1 and the fuel gas outlet 6B of the humidifier 6, descriptions thereof are omitted.

In the fuel cell system 100 according to the present variation, which is based on the fuel cell system 100 according to the second embodiment, the anode inlet 1A of the fuel cell 1 is arranged below the fuel gas outlet 6B of the humidifier 6.

Such a configuration enables the fuel gas supply path 2 between the anode inlet 1A of the fuel cell 1 and the fuel gas outlet 6B of the humidifier 6 to extend with a descending gradient. Thus, the condensed water that has failed to be processed in the humidifier 6 can be smoothly conveyed to the fuel cell 1 and water clogging in the fuel gas supply path 2 can be inhibited accordingly. Further, in the fuel cell 1, the condensed water can be utilized for the humidification of the fuel gas.

The fuel cell system 100 according to the present variation may have a configuration similar to that of the fuel cell system 100 according to the second embodiment, except the above-described features.

First Example

Figure 4:
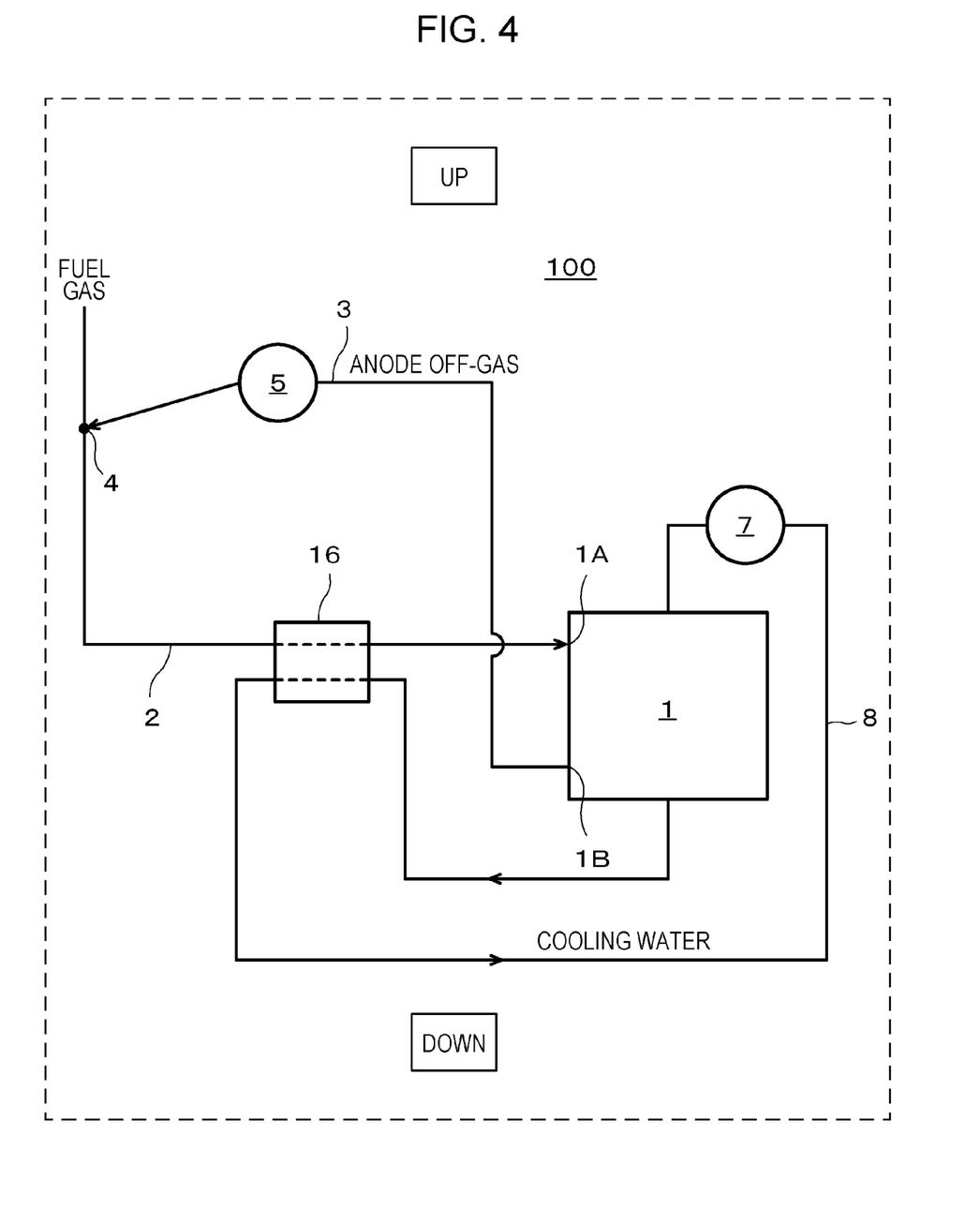
FIG. 4 illustrates an example of a fuel cell system according to a first example of the second embodiment.

FIG. 4 illustrates an example of the fuel cell system 100 according to the first example of the second embodiment.

In the example illustrated in FIG. 4, the fuel cell system 100 includes the fuel cell 1, the fuel gas supply path 2, the recycle gas path 3, the pressure booster 5, a total heat exchanger 16, a cooling water pump 7, and a cooling water circulation path 8. Since the fuel cell 1, the fuel gas supply path 2, the recycle gas path 3, and the pressure booster 5 are similar to those in the first embodiment, descriptions thereof are omitted.

The fuel cell system 100 according to the present example, which is based on the fuel cell system 100 according to the second embodiment or the variation of the second embodiment, includes the cooling water circulation path 8 for circulating cooling water that recovers heat of the fuel cell 1, and the aforementioned humidifier is the total heat exchanger 16 that exchanges latent heat and sensible heat between the cooling water and the fuel gas.

The fuel cell 1 produces heat through electric power generation. So when the fuel cell 1 is a PEFC for example, as illustrated in FIG. 4, the fuel cell system 100 includes the cooling water circulation path 8 for circulating the cooling water that recovers the heat of the fuel cell 1. In the cooling water circulation path 8, for example, the cooling water pump 7, which causes the cooling water to circulate in the cooling water circulation path 8, and a temperature sensor, which senses the temperature of the cooling water and is not illustrated, are arranged. Thus, the cooling water immediately after flowing out of the fuel cell 1 has a high temperature through the recovery of the heat of the fuel cell 1.

Thus, in the total heat exchanger 16, the cooling water that has recovered the heat of the fuel cell 1 is used as a heating fluid and the fuel gas is used as a heat receiving fluid.

As described above, in the fuel cell system 100 according to the present example, when the fuel gas passes through the total heat exchanger 16, heat and moisture are exchanged between the fuel gas and the cooling water, and the fuel gas can be humidified and heated.

Although a possibility of occurrence of heat energy loss can be raised when the cooling water radiates heat with an appropriate radiator, not illustrated, in circulating through the cooling water circulation path 8, in the fuel cell system 100 according to the present example, the above-described configuration can reduce such a possibility.

The fuel cell system 100 according to the present example may have a configuration similar to that of the fuel cell system 100 according to the second embodiment or the variation of the second embodiment, except the above-described features.

Second Example

Figure 5:
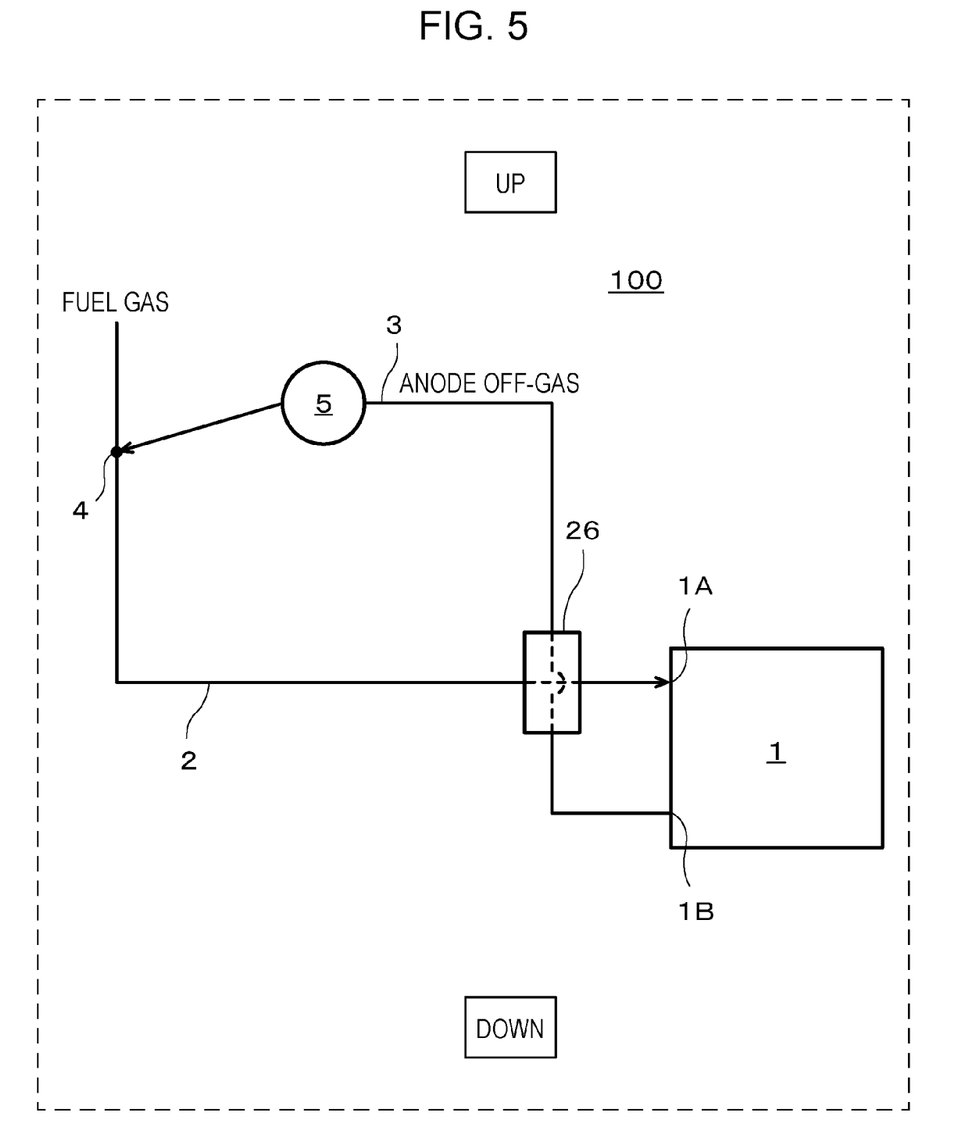
FIG. 5 illustrates an example of a fuel cell system according to a second example of the second embodiment.

FIG. 5 illustrates an example of the fuel cell system 100 according to the second example of the second embodiment.

In the example illustrated in FIG. 5, the fuel cell system 100 includes the fuel cell 1, the fuel gas supply path 2, the recycle gas path 3, the pressure booster 5, and a total heat exchanger 26. Since the fuel cell 1, the fuel gas supply path 2, the recycle gas path 3, and the pressure booster 5 are similar to those in the first embodiment, descriptions thereof are omitted.

In the fuel cell system 100 according to the present example, which is based on the fuel cell system 100 according to the second embodiment or the variation of the second embodiment, the aforementioned humidifier is the total heat exchanger 26, which exchanges latent heat and sensible heat between the anode off-gas and the fuel gas.

Immediately after being discharged from the anode outlet 1B of the fuel cell 1 the anode off-gas has a high temperature and contains a large amount of moisture.

Thus, in the total heat exchanger 26, the high-temperature anode off-gas is used as a heating fluid and the fuel gas is used as a heat receiving fluid.

As described above, in the fuel cell system 100 according to the present example, when the fuel gas passes through the total heat exchanger 26, heat and moisture are exchanged between the fuel gas and the cooling water, and the fuel gas can be humidified and heated.

Although possibilities of occurrence of heat energy loss or occurrence of water clogging in the recycle gas path 3 because of the condensed water caused in the anode off-gas cooling can be raised when the anode off-gas radiates heat from the recycle gas path 3 in circulating through the recycle gas path 3, in the fuel cell system 100 according to the present example, the above-described configuration can reduce such possibilities.

Further, since the amount of the supply of water from the outside needed to humidify the fuel gas can be decreased, costs for operating the fuel cell system 100 can be reduced.

The fuel cell system 100 according to the present example may have a configuration similar to that of the fuel cell system 100 according to the second embodiment or the variation of the second embodiment, except the above-described features.

Third Embodiment

Figure 6:
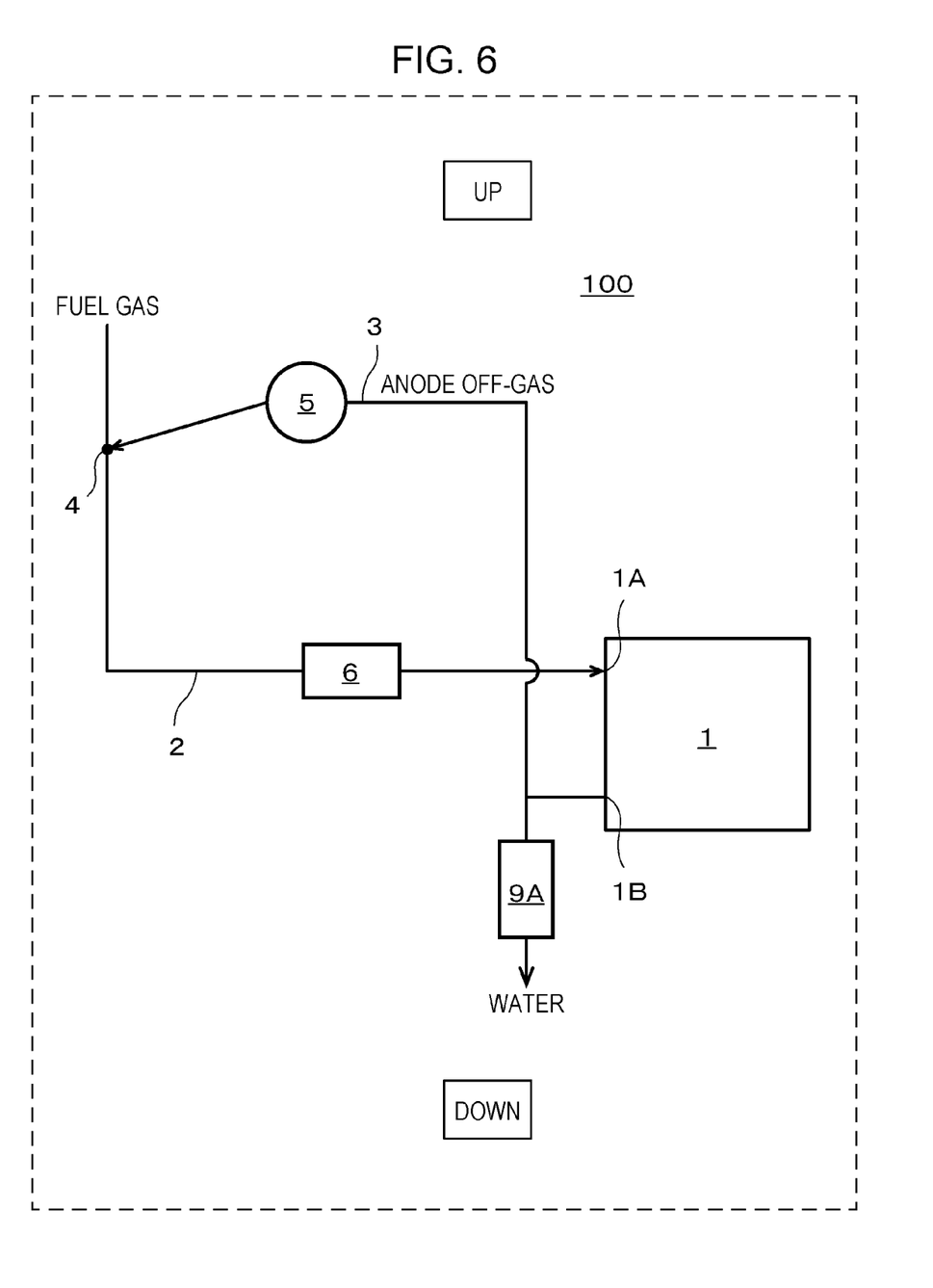
FIG. 6 illustrates an example of a fuel cell system according to a third embodiment.

FIG. 6 illustrates an example of a fuel cell system 100 according to a third embodiment.

In the example illustrated in FIG. 6, the fuel cell system 100 includes a fuel cell 1, a fuel gas supply path 2, a recycle gas path 3, a pressure booster 5, a humidifier 6, and a gas liquid separator 9A. Since the fuel cell 1, the fuel gas supply path 2, the recycle gas path 3, the pressure booster 5, and the humidifier 6 are similar to those in the first embodiment, descriptions thereof are omitted.

The fuel cell system 100 according to the present embodiment, which is based on the fuel cell system 100 according to any of the first to third aspects, the second embodiment, the variation of the second embodiment, and the first and second examples of the second embodiment, includes the gas liquid separator 9A arranged in the recycle gas path 3, and in a direction in which the anode off-gas flows, the fuel cell 1, the gas liquid separator 9A, the pressure booster 5, and a confluence portion 4 are arranged in this order.

The gas liquid separator 9A is a device that separates moisture in the anode off-gas flowing through the recycle gas path 3 from the anode off-gas. The gas liquid separator 9A may have any configuration only when the configuration enables the moisture in the anode off-gas flowing through the recycle gas path 3 to be separated from the anode off-gas.

Examples of the gas liquid separator 9A can include a tank arranged in a branch path that branches from the recycle gas path 3 between an anode outlet 1B of the fuel cell 1 and the pressure booster 5, and a sealing valve arranged at an appropriate position in the branch path.

When the gas liquid separator 9A is the aforementioned tank, for example, the anode off-gas undergoes water-sealing by connecting the branch path to a lower end portion of the tank. When the tank is filled to near its brim with water, the water is discharged to the outside through an appropriate drain outlet in an upper portion of the tank.

When the gas liquid separator 9A is the aforementioned sealing valve, and when the branch path is filled to near its brim with water, the water is discharged to the outside by temporarily opening the sealing valve.

As described above, in the fuel cell system 100 according to the present embodiment, even when condensed water is caused by the cooling of the anode off-gas discharged from the anode outlet 1B of the fuel cell 1, the gas liquid separator 9A can separate the condensed water from the anode off-gas. Accordingly, water clogging in the recycle gas path 3 because of the condensed water can be inhibited.

The fuel cell system 100 according to the present embodiment may have a configuration similar to that of the fuel cell system 100 according to any of the first embodiment, the second embodiment, the variation of the second embodiment, and the first and second examples of the second embodiment, except the above-described features.

Fourth Embodiment

Figure 7:
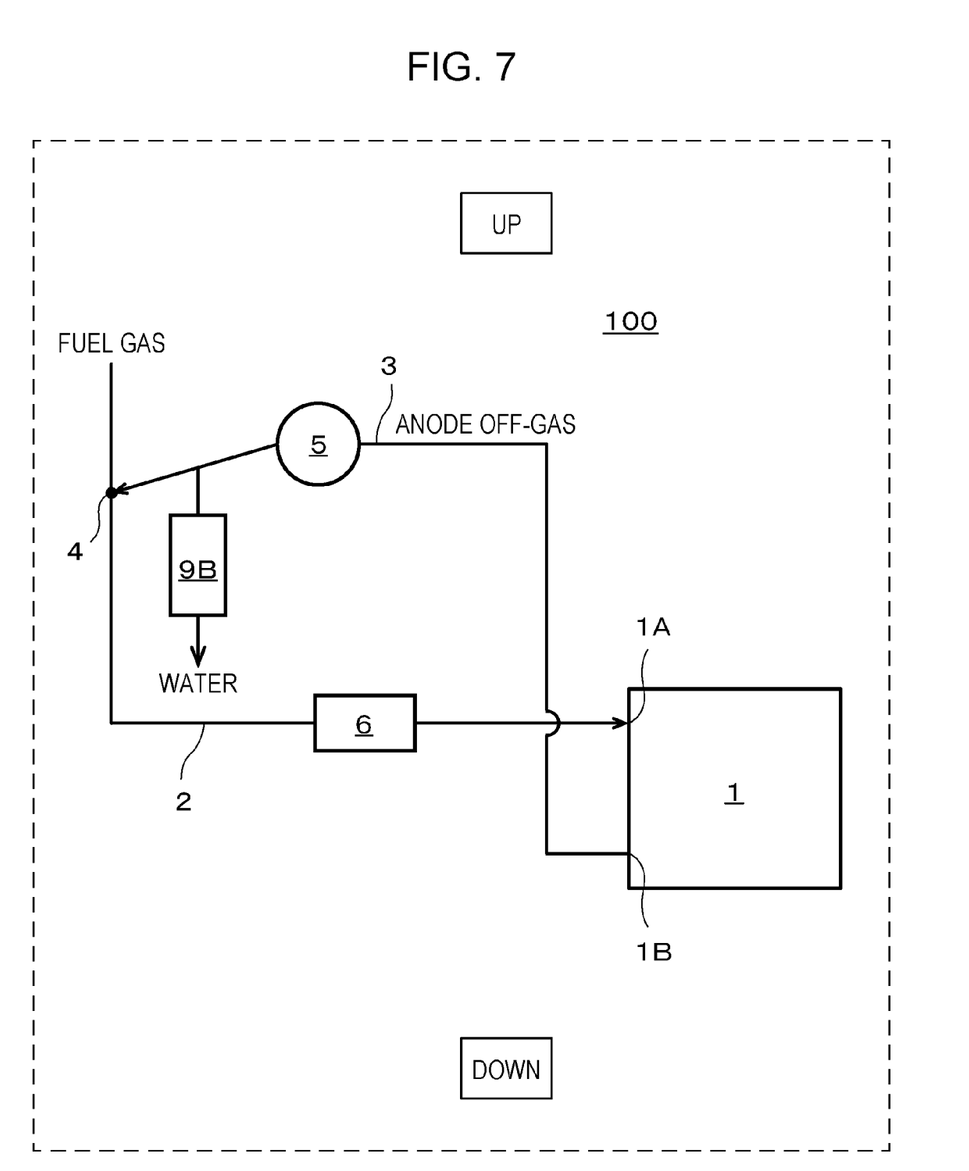
FIG. 7 illustrates an example of a fuel cell system according to a fourth embodiment.

FIG. 7 illustrates an example of a fuel cell system 100 according to a fourth embodiment.

In the example illustrated in FIG. 7, the fuel cell system 100 includes a fuel cell 1, a fuel gas supply path 2, a recycle gas path 3, a pressure booster 5, a humidifier 6, and a gas liquid separator 9B. Since the fuel cell 1, the fuel gas supply path 2, the recycle gas path 3, the pressure booster 5, and the humidifier 6 are similar to those in the first embodiment, descriptions thereof are omitted.

The fuel cell system 100 according to the present embodiment, which is based on the fuel cell system 100 according to any of the first to third aspects, the second embodiment, the variation of the second embodiment, and the first and second examples of the second embodiment, includes the gas liquid separator 9B arranged in the recycle gas path 3, and in a direction in which the anode off-gas flows, the fuel cell 1, the pressure booster 5, the gas liquid separator 9B, and a confluence portion 4 are arranged in this order.

The gas liquid separator 9B is a device that separates moisture in the anode off-gas flowing through the recycle gas path 3 from the anode off-gas. The gas liquid separator 9B may have any configuration only when the configuration enables the moisture in the anode off-gas flowing through the recycle gas path 3 to be separated from the anode off-gas. Example of the gas liquid separator 9B can include a tank arranged in a branch path that branches from the recycle gas path 3 between the pressure booster 5 and the confluence portion 4, and a sealing valve arranged at an appropriate position in the branch path. Since the tank and the sealing valve are similar to those in the third embodiment, detailed descriptions thereof are omitted.

As described above, in the fuel cell system 100 according to the present embodiment, even when condensed water is caused in the anode off-gas through the pressurization of the anode off-gas by the pressure booster 5, the gas liquid separator 9B can separate the condensed water from the anode off-gas. Thus, even if the humidifier 6 goes out of order, water clogging in the fuel gas supply path 2 because of the condensed water can be inhibited.

The fuel cell system 100 according to the present embodiment may have a configuration similar to that of the fuel cell system 100 according to any of the first embodiment, the second embodiment, the variation of the second embodiment, and the first and second examples of the second embodiment, except the above-described features.

Fifth Embodiment

Figure 8:
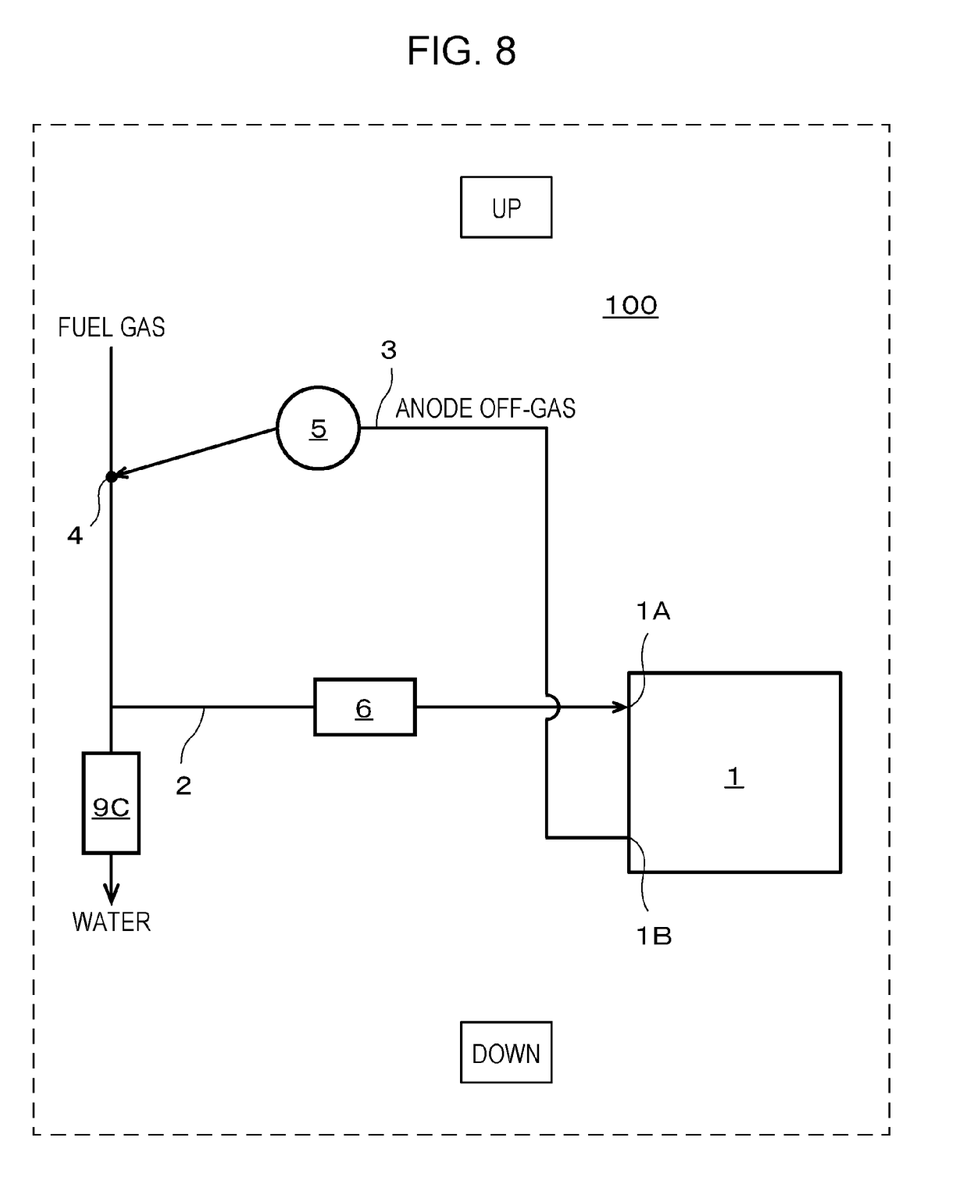
FIG. 8 illustrates an example of a fuel cell system according to a fifth embodiment.

FIG. 8 illustrates an example a fuel cell system 100 according to a fifth embodiment.

In the example illustrated in FIG. 8, the fuel cell system 100 includes a fuel cell 1, a fuel gas supply path 2, a recycle gas path 3, a pressure booster 5, a humidifier 6, and a gas liquid separator 90. Since the fuel cell 1, the fuel gas supply path 2, the recycle gas path 3, the pressure booster 5, and the humidifier 6 are similar to those in the first embodiment, descriptions thereof are omitted.

The fuel cell system 100 according to the present embodiment, which is based on the fuel cell system 100 according to any of the first to third aspects, the second embodiment, the variation of the second embodiment, and the first and second examples of the second embodiment, includes the gas liquid separator 90 arranged in the fuel gas supply path 2, and in a direction in which the anode off-gas flows, the fuel cell 1, the pressure booster 5, a confluence portion 4, and the gas liquid separator 90 are arranged in this order.

The gas liquid separator 90 is a device that separates moisture in the gas that flows through the fuel gas supply path 2 from the gas. The gas liquid separator 90 may have any configuration only when the configuration enables the moisture in the gas that flows through the fuel gas supply path 2 to be separated from the gas. Example of the gas liquid separator 90 can include a tank arranged in a branch path that branches from the fuel gas supply path 2 between the confluence portion 4 and the humidifier 6, and a sealing valve arranged at an appropriate position in the branch path. Since the tank and the sealing valve are similar to those in the third embodiment, detailed descriptions thereof are omitted.

As described above, in the fuel cell system 100 according to the present embodiment, even when condensed water is caused in the anode off-gas through the pressurization of the anode off-gas by the pressure booster 5, the gas liquid separator 90 can separate the condensed water from the gas that flows through the fuel gas supply path 2. Thus, even if the humidifier 6 goes out of order, water clogging in the fuel gas supply path 2 because of the condensed water can be inhibited.

The fuel cell system 100 according to the present embodiment may have a configuration similar to that of the fuel cell system 100 according to any of the first embodiment, the second embodiment, the variation of the second embodiment, and the first and second examples of the second embodiment, except the above-described features.

The first embodiment, the second embodiment, the variation of the second embodiment, the first and second examples of the second embodiment, and the third to fifth embodiments may be combined with each other as long as the embodiments do not preclude each other.

It is obvious from the descriptions above to persons skilled in the art that various modifications or other embodiments of the present disclosure may be made. Thus, the descriptions above should be interpreted as mere examples, and are provided so as to teach the most desirable embodiments for implementing the present disclosure to persons skilled in the art. The details of the structures and/or functions of the present disclosure may be substantially changed without departing from the spirit of the present disclosure.

An aspect of the present disclosure can be utilized for a fuel cell system that can convey condensed water caused in anode off-gas by a pressure booster more suitably than conventional systems.

What is claimed is:

1. A fuel cell system comprising:
    a fuel cell that generates electric power using fuel gas and oxidant gas;
    a fuel gas supply path through which the fuel gas is supplied to an anode inlet of the fuel cell;
    a recycle gas path through which anode off-gas discharged from an anode outlet of the fuel cell returns to the fuel gas supply path; and
    a pressure booster arranged in the recycle gas path,
    wherein the pressure booster is arranged above a confluence portion where the fuel gas supply path and the recycle gas path meet each other when gravity acts downward from above, and the pressure booster is coupled to and positioned higher than the confluence portion such that a pipe from the pressure booster to the confluence portion is sloped or declined in a direction of gravity.

2. The fuel cell system according to claim 1, wherein the recycle gas path between the pressure booster and the confluence portion extends at an identical level to the pressure booster and a level below the pressure booster, or extends only below the pressure booster.

3. The fuel cell system according to claim 1, wherein the anode inlet is arranged below the confluence portion.

4. The fuel cell system according to claim 1, further comprising
    a humidifier arranged in the fuel gas supply path, wherein
    in a direction in which the anode off-gas flows, the fuel cell, the pressure booster, the confluence portion, and the humidifier are arranged in this order, and a fuel gas inlet of the humidifier is arranged below the confluence portion.

5. The fuel cell system according to claim 4, wherein the anode inlet is arranged below a fuel gas outlet of the humidifier.

6. The fuel cell system according to claim 4, further comprising
    a cooling water circulation path through which cooling water that recovers heat of the fuel cell circulates, wherein
    the humidifier includes a total heat exchanger that exchanges latent heat and sensible heat between the cooling water and the fuel gas.

7. The fuel cell system according to claim 4, wherein the humidifier includes a total heat exchanger that exchanges latent heat and sensible heat between the anode off-gas and the fuel gas.

8. The fuel cell system according to claim 1, further comprising
    a gas liquid separator arranged in the recycle gas path, wherein
    in a direction in which the anode off-gas flows, the fuel cell, the gas liquid separator, the pressure booster, and the confluence portion are arranged in this order.

9. The fuel cell system according to claim 1, further comprising
    a gas liquid separator arranged in the recycle gas path, wherein
    in a direction in which the anode off-gas flows, the fuel cell, the pressure booster, the gas liquid separator, and the confluence portion are arranged in this order.

10. The fuel cell system according to claim 1, further comprising
    a gas liquid separator arranged in the fuel gas supply path, wherein
    in a direction in which the anode off-gas flows, the fuel cell, the pressure booster, the confluence portion, and the gas liquid separator are arranged in this order.

* * * * *